United States Patent [19]

Gaines et al.

[11] 4,057,304
[45] Nov. 8, 1977

[54] HEAVY DUTY RESILIENT COUPLING ASSEMBLY

[75] Inventors: Donald R. Gaines, Farmington Hills; Jon M. Smallegan, Ann Arbor; William H. Trudeau, Brighton, all of Mich.

[73] Assignee: Gulf & Western Manufacturing Company, Southfield, Mich.

[21] Appl. No.: 737,071

[22] Filed: Nov. 1, 1976

[51] Int. Cl.² ............................................. F16C 9/04
[52] U.S. Cl. ........................... 308/237 A; 308/238; 308/239
[58] Field of Search .............. 308/237 R, 237 A, 238, 308/239, 216, 37

[56] References Cited

U.S. PATENT DOCUMENTS

| | | | |
|---|---|---|---|
| 2,970,019 | 1/1961 | Brown et al. | 308/237 R |
| 3,934,958 | 1/1976 | Turner | 308/238 |
| 3,989,126 | 11/1976 | Katzer | 308/238 X |

Primary Examiner—Trygve M. Blix
Assistant Examiner—Douglas C. Butler
Attorney, Agent, or Firm—Barnes, Kisselle, Raisch & Choate

[57] ABSTRACT

A resilient coupling assembly having a housing with a generally cylindrical bore therein, a shank with a generally cylindrical portion received in the bore, and a bushing of an elastomeric material interposed between the housing and the cylindrical portion of the shank. A plurality of circumferentially spaced bearing inserts are interposed between the housing and the cylindrical portion of the shank and each received in a bearing retainer passage extending generally radially through the bushing.

19 Claims, 7 Drawing Figures

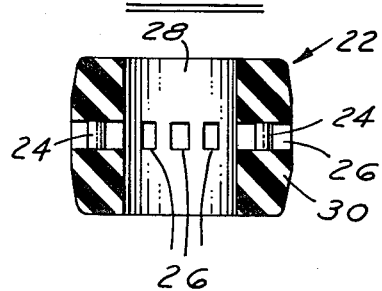
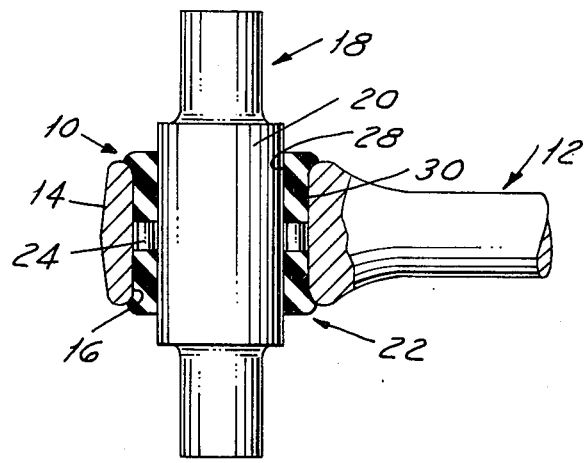
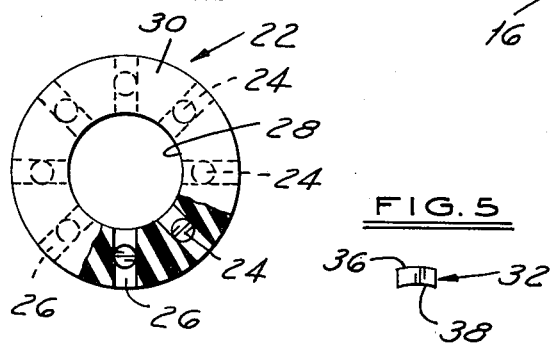
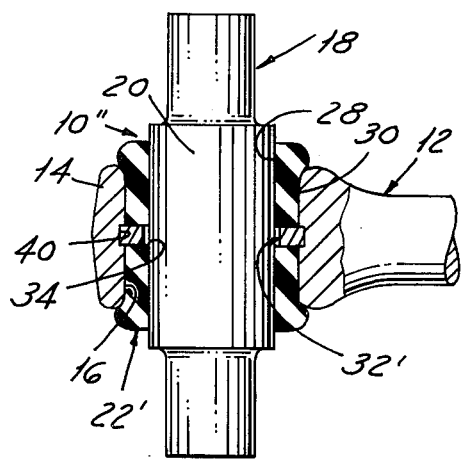
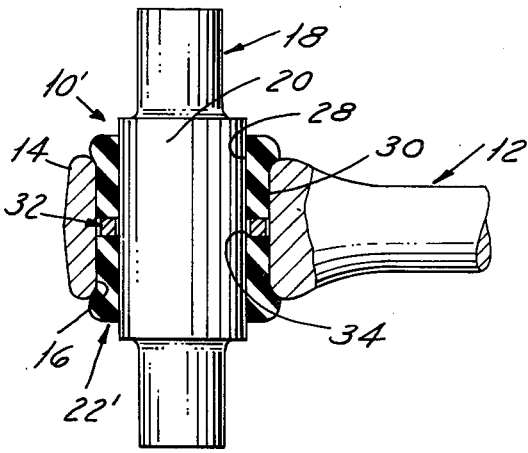

HEAVY DUTY RESILIENT COUPLING ASSEMBLY

This invention relates to resilient coupling assemblies and more particularly to the type of resilient coupling assemblies commonly used with torque rods and stablizer bars in the rear axle suspension systems of vehicles.

Resilient coupling assemblies have been previously used with torque rods in both light and heavy duty vehicles. Coupling assemblies for such vehicles have a housing with a cylindrical bore, a shank with a cylindrical portion received in the bore, and a resilient bushing interposed and frictionally received between the bore and the cylindrical portion of the shank. The maximum load which such coupling assemblies can withstand in a direction generally transverse to the axis of the bushing is dependent on the particular elastomeric material and thickness of the bushing and is limited by the rupture strength of the elastomeric material. Due to the rather limited rupture strength of suitable elastomeric materials, such coupling assemblies for heavy duty vehicles are comparatively large and bulky.

Resilient coupling assemblies of rear suspension systems are subjected to both static loads and when the vehicle is moving, impact loads which may be severe. In light duty vehicles these loads are small compared to the loads encountered by coupling assemblies in heavy duty vehicles such as heavy duty trucks, earth movers, tractors, off-the-road vehicles, etc. In such heavy duty vehicles coupling assemblies should be of rugged and durable construction and must be capable of functioning properly under large static and impact loads, in dusty, dirty, and moist environments and often with mud, coal particles, cement particles, or other particulate contaminants encrusted on the coupling assemblies.

Objects of this invention are to provide a resilient coupling assembly suitable for heavy duty vehicle applications having a high resistance to impact loading and a long service life, and which is rugged, durable, compact, and of economical manufacture and assembly.

These and other objects, features and advantages of this invention will be apparent from the following detailed description, appended claims, and accompanying drawing in which:

FIG. 1 is a fragmentary side view with portions broken away of a torque rod having a resilient coupling assembly embodying this invention;

FIGS. 2 and 3 are sectional and end views respectively of a resilient bushing of the coupling assembly of FIG. 1;

FIG. 4 is a fragmentary side view with portions broken away of a torque rod having a modified resilient coupling assembly embodying this invention;

FIGS. 5 and 6 are side and top views respectively of a bearing insert of the coupling assembly of FIG. 4; and FIG. 7 is a fragmentary side view with portions broken away of a torque rod having another modified resilient coupling assembly embodying this invention.

Referring in more detail to the drawing, FIG. 1 illustrates a coupling assembly 10 embodying this invention which is on one end of a metal torque rod 12 preferably of steel or aluminum. Coupling 10 has a housing 14 which is preferably forged as an integral portion of torque rod 12 and has a generally cylindrical bore 16 therethrough. A metal shank 18 preferably of steel or aluminum with an enlarged cylindrical portion 20 is retained in housing 14 by a resilient bushing 22.

In accordance with one feature of this invention, rupture of bushing 22 is prevented by limiting the extent to which the bushing can be compressed between shank 18 and housing 14 by the application of a load generally transverse to the axis of the bushing. The compression of bushing 22 is limited by a plurality of circumferentially spaced bearing inserts in the form of roller pins 24 interposed between shank 18 and housing 14.

As shown in FIGS. 2 and 3, resilient bushing 22 has a plurality of equally circumferentially spaced retainer passages 26 in which roller pins 24 are received. Each retainer passage 26 has a generally rectangular cross section and extends generally radially through bushing 22. In assembly, bushing 22 is frictionally received between housing 14 and shank 18 and preferably is sufficiently compressed therebetween such that as the shank is rotated up to 5° relative to the housing in either direction from the unloaded position of the coupling assembly 10, there is no movement of the cylindrical inner surface 28 of bushing 22 relative to shank 18 and no movement of the generally circular outer surface 30 of bushing 22 relative to housing 14. This can usually be accomplished by making the bushing 22 so that when it is unstressed, it has an inside diameter in the range of 85 to 95 percent of the outside diameter of cylindrical portion 20 of shank 18 and with a maximum outside diameter of the central cylindrical portion of the bushing in the range of 105 to 115 percent of the inside diameter of bore 16 in housing 14. This construction and arrangement of bushing 22 prevents abrasion and wearing away of surface 28 and 30 of the bushing during normal use of the coupling assembly, provides a sealing arrangement totally encapsulating roller pins 24 so that particulate contaminants cannot enter bearing passages 26 and contaminate the bearing assembly provided by the cooperation of roller pins 24 with housing 14 and shank 18, and provides a coupling assembly which creates a torque opposing relative rotation of shank 18 and housing 14.

FIG. 4 illustrates a torque rod 12 with a modified coupling assembly 10' which is essentially the same as coupling assembly 10 except that it has bearing inserts in the form of generally rectangular pads 32 rather than roller pins 24. Bearing pads 32 are received in equally circumferentially spaced retainer passages 34 extending generally radially through resilient bushing 22' and having a generally rectangular cross section.

As shown in FIGS. 5 and 6, each bearing pad 32 has an outer arcuate surface 36 and a generally opposed inner arcuate surface 38 which are respectively adapted for complimentary engagement with and have the same radius of curvature as bore 16 of housing 14 and cylindrical portion 20 of shank 18. To facilitate tilting of shank 18 with respect to the longitudinal axis of rod 12 while still providing a greater bearing surface area than the theoretical line contact of roller pins 24 in coupling 10, the outer surface 36 and inner surface 38 of each pad 32 has a relatively narrow axial width and a comparatively longer circumferential length. Bearing pads 32 provide a greater surface area for contact with housing 14 and shank 18 than the line contact provided by roller pins 24 and hence, increase the maximum load carrying capability of coupling assembly 10' compared to coupling assembly 10.

FIG. 7 illustrates a modified coupling assembly 10" which is essentially the same as coupling assembly 10' except that resilient bushing 22' in addition to being frictionally retained in bore 16 of housing 14 is also locked in the bore by bearing pads 32', one end of each of which is received in a circumferentially continuous groove 40 in housing 14 opening into bore 16. Bearing pads 32' are essentially the same as bearing pads 32 except that they have a greater radial thickness so that in assembly, a portion of each bearing pad 32' will always be received in groove 40. This construction and arrangement of bearing pads 32' and groove 34, keys the bushing 22' in housing 14 so that the bushing will not be forced generally axially out of the housing when the coupling is subjected to a particularly large load thereby preventing premature failure of the coupling assembly.

Preferably in coupling assemblies 10, 10' and 10" roller pins 24 and bearing inserts 32 and 32' are each located in housing 14 so that they are centered over the line of the net resultant force in a plane transverse to the axis of the bore 16 of the housing produced by a static load on the coupling assembly which in assemblies 10, 10' and 10" is coincident with the longitudinal centerline of torque rod 12. To permit shank 18 to pivot or tilt slightly (usually at least 2° or 3° with respect to housing 14 of coupling assemblies 10, 10' and 10", bore 16 of the housing, cylindrical portion 20 of the shank, and the diameter of roller pins 24 or the radial thickness of bearing pads 32 and 32' are dimensioned such that there is a slight clearance therebetween (as shown in FIGS. 1, 4 and 7 respectively) when no loads are placed on the coupling assemblies. It is usually preferable where possible to also provide such a clearance when the coupling assemblies are subjected to normal static and operating loads in order to minimize wear on roller pins 24 or bearing pads 32, 32' and the associated surfaces of the housing and the shank. However, such clearance must always be small enough to prevent the elastomeric material of bushing 22 or 22' from being compressed when the coupling assembly is subjected to a load to such an extent that the elastomeric material ruptures. Thus, such clearance must always be small enough to permit one or more of the roller pins 24 or bearing pads 32, or 32' to simultaneously engage both bore 16 of the housing and cylindrical portion 20 of the shank before the elastomeric material of bushing 22 or 22' is sufficiently compressed to exceed its rupture strength and preferably before exceeding its elastic limit such as when the coupling assembly is subjected to an abnormally large static load or a severe impact load.

Bushings 22 and 22' are made of an elastomeric material such as rubber or polyurethane which is resilient, weather resistant, has a high spring rate, a good elastic memory, and preferably a high rupture strength for an elastomeric material. In some applications the elastomeric material is preferably also highly oil resistant. It is believed that elastomeric materials suitable for bushings 22 and 22' should have a durometer hardness of at least 55 and preferably in the range of 65 to 85 on the Shore D scale. Roller pins 24 and bearing pads 32 and 32' are made of materials having a low coefficient of friction such as nylon, high density thermosetting plastics, brass, bronze, and compacted and sintered powdered iron. Roller pins 24 and bearing pads 32 and 32' are sufficiently rigid or incompressible such that when the couplings 10, 10' and 10" are subjected to a maximum load in a direction generally transverse to the axis of the bushing, the elastomeric material of the bushing is not compressed beyond it rupture strength and preferably not beyond its elastic limit.

Resilient couplings 10, 10' and 10" may be assembled by press fitting bushing 22 or 22' into bore 16 of housing 14, inserting roller pins 24 or bearing pads 32 or 32' into passages 26 or 34 of bushing 22 or 22', and then press fitting cylindrical portion 20 of shank 18 into bushing 22 or 22'. These press fitting operations are greatly facilitated by the use of a suitable lubricating liquid containing a solvent which will evaporate after the component parts have been assembled. Such a lubricant may be a mixture of water and soap or water, soap, and a small quantity of soluble oil. When the solvent of the lubricating solution evaporates, the coefficient of friction between the engaging surfaces of the housing, bushing, and shank increases so that there is no relative movement of such engaging surfaces as the housing and the shank are rotated a few degrees in either direction from their unloaded position.

Whenever coupling assemblies 10, 10' and 10" are in use, at least a portion of the load will be transmitted between housing 14 and shank 18 through bushing 22 or 22' and whenever the load sufficiently compresses the bushing between the shank and the housing to simultaneously engage both the housing and the shank with one or more roller pins 24 or bearing pads 32 or 32', a portion of such load will be transmitted through such roller pins or bearing pads. In some applications the load to which coupling assemblies 10, 10' and 10" are normally subjected may be so great that the bushing 22 or 22' is sufficiently compressed so that one or more roller pins 24 or bearing pads 32 or 32' will be continuously simultaneously engaged with both the housing and the cylindrical portion 20 of shank 18 and thereby continuously transmitting a portion of the load through the roller pins or bearing pads.

By providing a coupling with a plurality of circumferentially spaced bearing inserts interposed between a housing and a shank and retained therein by a bushing of an elastomeric material, the construction and arrangement of this invention provides a resilient coupling assembly suitable for heavy duty applications. This construction and arrangement also provides a coupling assembly which is rugged and durable and has a high resistance to impact loading and a long service life. By utilizing the resilient bushing to both retain and encapsulate the bearing inserts as well as resiliently mount the shank in the housing, this invention provides a heavy duty coupling assembly of comparatively simple design having relatively few component parts and which is of economical manufacture and assembly.

We claim:

1. A resilient coupling assembly comprising a housing member having a generally cylindrical bore opening to the exterior thereof, a shank member having a generally cylindrical portion received in said bore with an annular space between said bore and said cylindrical portion of said members, a one-piece circumferentially continuous bushing of a resilient elastomeric material received between said members and constructed and arranged with a generally circular outer surface portion in engagement with said cylindrical bore of said housing member and a generally inner surface portion in engagement with said cylindrical portion of said shank member, said bushing having a plurality of circumferentially spaced retainer passages each extending generally radially through said bushing and opening into both said cylindrical bore and said cylindrical portion of said members, and a plurality of bearing inserts each received in only one of said retainer passages and between said cylindrical bore and cylindrical portion of said members, each of said bearing inserts being dimensioned to provide a clearance between each bearing insert and said cylindrical bore and cylindrical portion of said members when said members are unloaded, said bushing being compressible to at least the extent of said clearance without rupture of said resilient elastomeric material.

2. The resilient coupling assembly of claim 1 wherein each of said bearing inserts is substantially centered and retained by said bushing over the line of the net resultant force in a plane transverse to the axis of said bore of said housing member produced by a static load on said coupling assembly.

3. The resilient coupling assembly of claim 1 wherein said elastomeric material has a durometer hardness of at least 55 on the Shore D scale.

4. The resilient coupling assembly of claim 1 wherein said elastomeric material of said bushing has a durometer hardness in the range of 55 to 85 on the Shore D scale.

5. The resilient coupling assembly of claim 1 wherein said bushing is received between said members such that as said members are rotated up to 5° relative to each other in both directions from the unloaded position of said members there is no movement of said circular outer surface portion of said bushing relative to said bore of said housing member and no movement of said circular inner surface portion of said bushing relative to said cylindrical portion of said shank member.

6. The resilient coupling assembly of claim 1 wherein said housing member has at least one recess therein opening into said bore of said housing and at least one of said bearing inserts is constructed and arranged to also extend into said recess to key said bushing in said bore of said housing member.

7. The resilient coupling assembly of claim 1 wherein said housing member has a circumferentially extending groove therein opening into said bore and said bearing inserts are constructed and arranged to also extend into said groove to key said bushing in said bore of said housing member.

8. The resilient coupling assembly of claim 1 wherein said bearing inserts are each dimensioned such that said clearance is sufficient such that when a normal static load is applied to said members in a direction generally transverse to the axis of said bore of said housing member, none of said bearing inserts simultaneously engage both of said members to transmit any portion of said normal static load through any of said bearing inserts.

9. The resilient coupling assembly of claim 8 wherein said elastomeric material has a durometer hardness of at least 55 on the Shore D scale.

10. The resilient coupling assembly of claim 1 wherein said bearing inserts are roller pins.

11. The resilient coupling assembly of claim 10 wherein each of said bearing inserts is substantially centered and retained by said bushing over the line of the net resultant force in a plane transverse to the axis of said bore of said housing member produced by a static load on said coupling assembly.

12. The resilient coupling assembly of claim 10 wherein said bearing inserts are each dimensioned such that said clearance is sufficient such that when a normal static load is applied to said members in a direction generally transverse to the axis of said bore of said housing member, none of said bearing inserts simultaneously engage both of said members to transmit any portion of said normal static load through any of said bearing inserts.

13. The resilient coupling assembly of claim 12 wherein said elastomeric material has a durometer hardness of at least 55 on the Shore D scale.

14. The resilient coupling assembly of claim 1 wherein said bearing inserts have two generally opposed finite surface areas respectively contoured for engagement with said cylindrical bore and said cylindrical portion of said members.

15. The resilient coupling assembly of claim 14 wherein each of said bearing inserts is substantially centered and retained by said bushing over the line of the net resultant force in a plane transverse to the axis of said bore of said housing member produced by a static load on said coupling assembly.

16. The resilient coupling assembly of claim 14 wherein the generally circumferential length of each of the finite surface areas of said bearing inserts exceeds the generally axial width of such finite surface areas.

17. The resilient coupling assembly of claim 16 wherein said bearing inserts are each dimensioned such that said clearance is sufficient such that when a normal static load is applied to said members in a direction generally transverse to the axis of said bore of said housing member, none of said bearing inserts simultaneously engage both of said members to transmit any portion of said normal static load through any of said bearing inserts.

18. The resilient coupling assembly of claim 14 wherein said bearing inserts are each dimensioned such that said clearance is sufficient such that when a normal static load is applied to said members in a direction generally transverse to the axis of said bore of said housing member, none of said bearing inserts simultaneously engage both of said members to transmit any portion of said normal static load through any of said bearing inserts.

19. The resilient coupling assembly of claim 18 wherin said elastomeric material of said bushing has a durometer hardness in the range of 55 to 85 on the Shore D scale.

* * * * *